United States Patent [19]

Martovitz

[11] Patent Number: 5,034,574
[45] Date of Patent: Jul. 23, 1991

[54] JOYSTICK FOR COMPUTER KEYBOARDS

[76] Inventor: Thomas J. Martovitz, 179 Oakleigh, Brunswick, Ohio 44212

[21] Appl. No.: 182,419

[22] Filed: Apr. 18, 1988

[51] Int. Cl.⁵ .................... H01H 13/70; H01H 25/00
[52] U.S. Cl. .......................... 200/6 A; 273/DIG. 28; 273/148 B; 235/145 R; 340/709; 200/330
[58] Field of Search .............................. 200/6 A, 330; 273/148 B, DIG. 28; 235/145 R; 340/709

[56] References Cited

U.S. PATENT DOCUMENTS 4,439,648  3/1984  Reiner et al. .................. 200/6 A
4,575,591  3/1986  Lugaresi .................... 340/365 R X
4,825,019  4/1989  Fisher ...................... 235/145 R X Primary Examiner—J. R. Scott
Attorney, Agent, or Firm—J. Helen Slough

[57] ABSTRACT

An integrally formed joystick for a computer keyboard having a central hollow housing loosely fitted over a center key and capping the same, the stick having two or more spaced arms extending externally from the central housing and adapted to make contact by depression of an arm or arms with a key or keys adjacent to the center keys to effect a desired graphic display in a direction selected by the operator.

3 Claims, 2 Drawing Sheets

JOYSTICK FOR COMPUTER KEYBOARDS

This invention relates to control sticks or as commonly termed joysticks for computer keyboards and relates more particularly to joysticks for actuating various different selected keys of the keyboard, the stick being adapted to be fit over a selector key and operable from its seated position in various directions to activate different adjacently situated keys.

BACKGROUND OF THE INVENTION

In the past, computer keys were individually manipulated by operator touch. Joysticks such as shown in U.S. Pat. No. 4,575,591 have been provided to overlie the keys and have been provided with handles. In the said patent the lower end is mounted on a base member for pivotal movement, the base having a socket to accomodate a ball on the lower end of the handle, and the base having arms extending therefrom, the handle being adapted for movement between operative and non-operative positions. In said patent, the handle is pivotally movable into engagement with a selected one of said arms to move the selected arm into depressing engagement with an associated one of the keys.

The joystick is provided with a dome-shaped housing mounted on the base member and the upper end portion of the handle projects therethrough and engages notches to limit the movement of the handle during engagement of the handle with a selected key.

In U.S. Pat. No. 4,408,103 a multi-position switch is disclosed which is contained in the housing for a game, which switch is manipulated by a joystick to contact the switch at different contact regions.

In U.S. Pat. No. 4,680,577 a multipurpose keyswitch is disclosed that moves laterally to provide cursor control and moves vertically for character entry under sensor control. The switch provides a pivotal mounting to couple the key cap to the keyboard. The key cap is displaceable.

SUMMARY OF THE INVENTION

The invention provides a new and novel joystick which is inexpensive to manufacture, being integral and composed of no moving parts, is adapted to be form-fit and telescoped over a selector key or keys and from the mounted position thereon readily, by simple movement of a handle part thereof, moved vertically, diagonally or horizontally, adapted to simultaneously or at will hold one or more keys down.

In use, various software programs are provided with electronic games and require the operator to monitor graphics for varied keyboard displacements. Said graphics are reproduced upon a display panel and produced by contact of the selected key or keys with conductive contacts by means of the operation of the joystick.

IN THE DRAWINGS

Other objects of the invention and the invention itself will become more readily apparent from a purview of the description herein considered in the light of the following drawings.

DETAILED DESCRIPTION OF THE INVENTION

Figure 4:
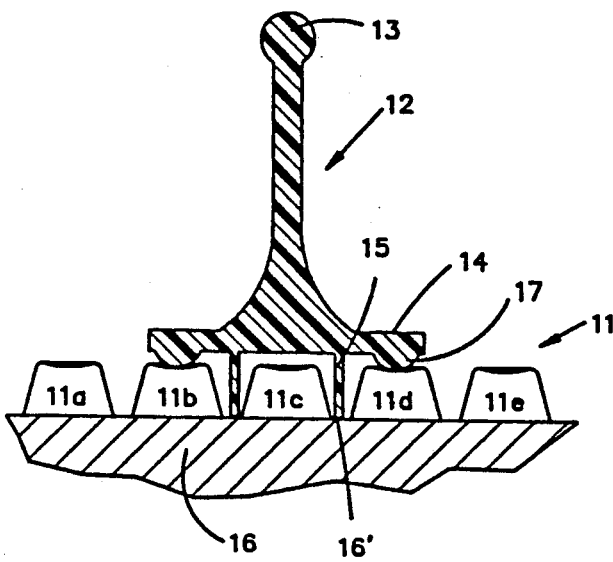
FIG. 4 is a sectional view taken on the line 4—4 of FIG. 1.
Figure 5:
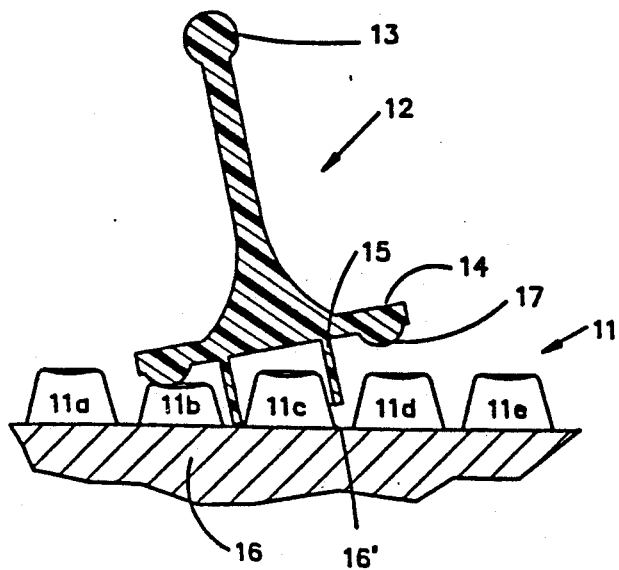
FIG. 5 is a view similar to FIG. 4 showing the joystick in a tilted alternate position.

Referring now to the drawings in all of which like parts are designated by like reference characters, at 10 is shown a computer keyboard having a plurality of keys arranged in a rectangular array, the keys being shown at 11. A keyboard joystick 12 preferably of plastic is provided with a central hollowed-out cube 15 shaped to conform to the shape of the keys and said cube is slightly longer than the keys and adapted to fit loosely thereover as shown in FIGS. 4 and 5 the sides of the cube being of a depth sufficient to be seated upon portions 16' of the base 16 of the keyboard disposed between the key 11c over which the joystick is shown placed and adjacent neighboring keys indicated at 11a, 11b, 11d, and 11e in the aforesaid figures. As shown the stick is loosely disposed over a selected key 11c and actuation of the handle by a user can depress an arm or arms over a single key, two keys or a plurality of keys to achieve the desired signal for controlling the game display. The stick 12 has a plurality, preferably 4 in number, of radially extending arms 14 and the said arms are preferably provided with nodes or protuberances 17 adapted to contact a selected conductor key or keys 11 by manual movement of the handle 13 to depress or tilt the selected key or keys to signal command input to a display panel (not shown).

Figure 2:
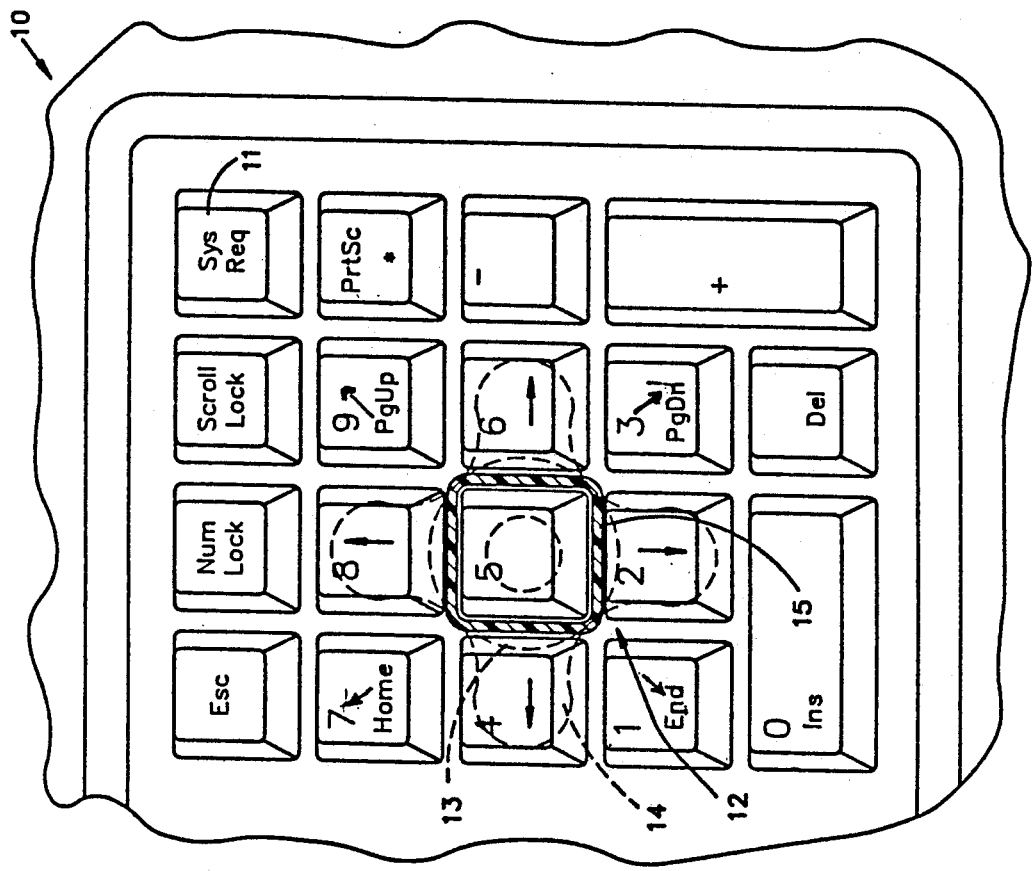
FIG. 2 is a view similar to FIG. 1 but showing a sectional view of the joystick housing.
Figure 1:
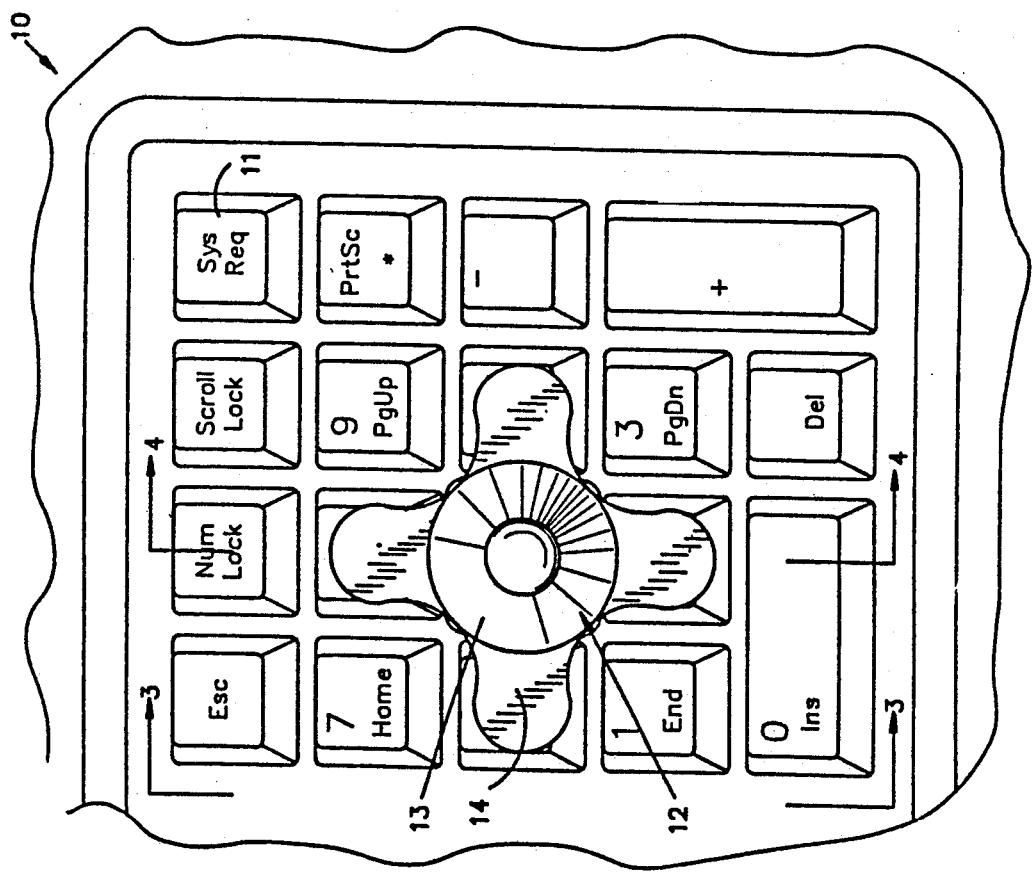
FIG. 1 is a plan view of a portion of a computer keyboard showing the joystick of the invention associated therewith.
Figure 3:
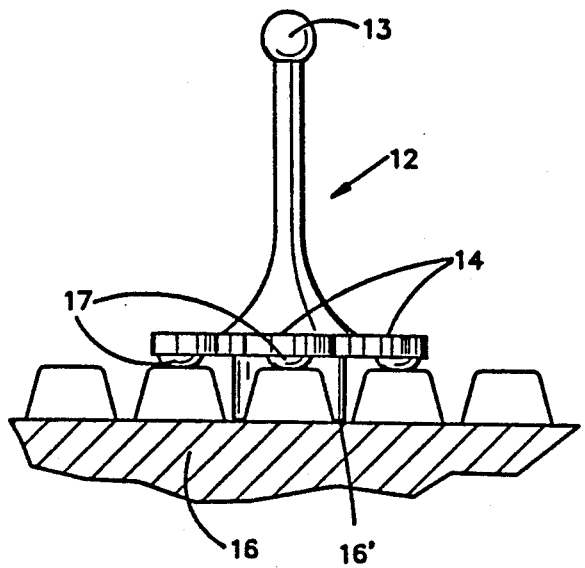
FIG. 3 is a sectional view taken on the line 3—3 of FIG. 1.

In FIGS. 1, 2, 3 and 4 each of the four arms 14 of the cruciform shaped joystick are disposed above keys numbered 2, 4, 6 and 8 and toggling the same by either optional depression of keys 2, 4, 6 and 8 alternately as by tilting as shown in FIG. 5, or simultaneously by depression of adjacent keys such as 2 and 4, 4 and 8, 8 and 6 or 6 and 2, achieves the directional movement as indicated on FIG. 2 and enables movement on the display which can be controlled as indicated by the arrows in FIG. 2. When a pair of keys, such as those numbered 2 and 4, or 4 and 8, 8 and 6, 6 and 2, are manually simultaneously depressed, a diagonal showing as indicated on keys 1, 3, 7 and 9 can be made on the display If the showing is desired in a direction at right angles to the center key it is achieved by depression of only one of said keys as shown in FIG. 5.

It will be observed that since the central hollowed-out cube fits loosely over the center key, the joystick can be tilted in action to manipulate either one or two keys at one time, as desired by placing the selected arm or arms on the selected key or keys.

It will be obvious further from the disclosure that various combinations and operations of the keys can be achieved to control the display and various shaped handles, arms and key caps can be made for fitting over keys of different designs without however departing from the spirit of this invention or the scope of the appended claims.

I claim:

1. A joystick assembly for a computer keyboard having a plurality of keys arranged in a rectangular array comprising in combination, a central hollowed housing adapted to be loosely fitted over one of said keys to cap the same, said housing having an upstanding handle, a plurality of equally spaced separate and elongated actuating arms integrally mounted on said housing, said elongated arms being located equidistant to one another and extending at right angles to said handle, one of said arms being adapted to be tilted into engagement with a selected key adjacent to the key over which the housing is placed, by means of movement of said handle.

2. A joystick assembly as claimed in claim 1 wherein tilting of the handle effects movement of an arm bringing the same into contact with a selected key for movement at right angles to the capped key.

3. A joystick assembly as claimed in claim 1 wherein a pair of arms are tilted by movement of the handle into engagement with a pair of spaced keys each disposed at right angles to the capped key to produce a diagonal showing on a computer graphic display panel.

* * * * *